US007240828B2

(12) United States Patent
Helez et al.

(10) Patent No.: US 7,240,828 B2
(45) Date of Patent: Jul. 10, 2007

(54) INSECT REPELLING POINT OF SALE TERMINAL

(75) Inventors: Ronen Helez, Ramat Gan (IL); Hana Reller, Hod Hasharon (IL)

(73) Assignee: Verifone Israel Ltd., Rosh Ha'Ain (IL)

( * ) Notice: Subject to any disclaimer, the term of this patent is extended or adjusted under 35 U.S.C. 154(b) by 55 days.

(21) Appl. No.: 11/147,710

(22) Filed: Jun. 7, 2005

(65) Prior Publication Data
US 2006/0273172 A1 Dec. 7, 2006

(51) Int. Cl.
*G06F 19/00* (2006.01)
*G07G 1/00* (2006.01)
(52) U.S. Cl. .......................... 235/379; 902/22; 235/7 R
(58) Field of Classification Search ................ 235/449, 235/379, 383, 7 R; 902/8, 13, 17, 9, 22; 705/16
See application file for complete search history.

(56) References Cited

U.S. PATENT DOCUMENTS 6,057,646 A * 5/2000 Pieroth et al. .............. 315/149

6,403,894 B1   6/2002 Iwasaki et al.
2002/0179241 A1 * 12/2002 Haniu et al. .............. 156/308.6
2004/0007620 A1 * 1/2004 Hirasawa et al. ........... 235/449

FOREIGN PATENT DOCUMENTS

JP         02000060412 A  *  3/2000
WO        WO 96/028749         9/1996

OTHER PUBLICATIONS

Patent abstract of Japanese patent No. JP 2000224949.
Patent abstract of Japanese patent No. JP 10056941.

* cited by examiner

*Primary Examiner*—Daniel A. Hess
(74) *Attorney, Agent, or Firm*—Welsh & Katz, Ltd.

(57) ABSTRACT

A point of sale terminal including a housing defining at least one interior location and at least one opening from the outside through which an insect can enter the at least one interior location, point of sale electronic circuitry located within the housing, at least one light source located within the housing and being operative to illuminate at least one region adjacent the at least one opening and light source driving circuitry operative to cause the at least one light source to output radiation of a type which repels an insect otherwise seeking to enter via the at least one opening.

26 Claims, 2 Drawing Sheets

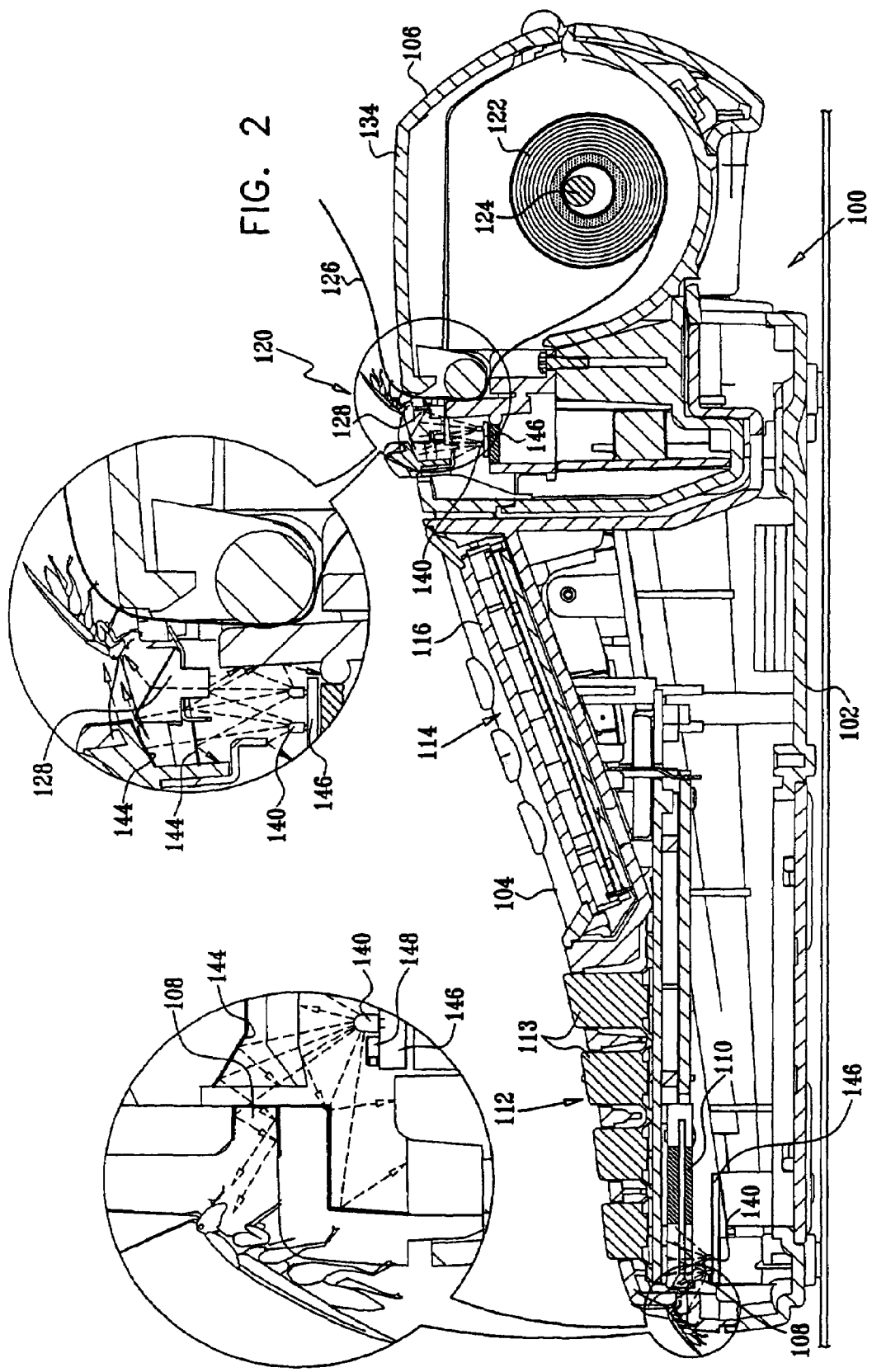

US 7,240,828 B2

INSECT REPELLING POINT OF SALE TERMINAL

FIELD OF THE INVENTION

The present invention relates to point of sale terminals generally.

BACKGROUND OF THE INVENTION

The following patents are believed to represent the current state of the art:

Japanese Patents JP2000224949 (English Abstract) and JP10056941 (English Abstract) and U.S. Pat. No. 6,403,894.

SUMMARY OF THE INVENTION

The present invention seeks to provide an improved point of sale terminal.

There is thus provided in accordance with a preferred embodiment of the present invention a point of sale terminal including a housing defining at least one interior location and at least one opening from the outside through which an insect can enter the at least one interior location, point of sale electronic circuitry located within the housing, at least one light source located within the housing and being operative to illuminate at least one region adjacent the at least one opening and light source driving circuitry operative to cause the at least one light source to output radiation of a type which repels an insect otherwise seeking to enter via the at least one opening.

Preferably, the at least one light source includes an LED. Additionally or alternatively, the at least one light source is mounted onto a printed circuit board forming part of the point of sale electronic circuitry. Additionally, the light source driving circuitry is also mounted onto the printed circuit board.

Preferably, the point of sale terminal also includes at least one reflective surface located within the housing for reflecting light from the at least one light source towards the at least one region adjacent the at least one opening. Additionally, the at least one reflective surface includes an interior surface of the housing.

Preferably, the light source driving circuitry is responsive to ambient light conditions in the vicinity of the point of sale terminal to vary the extent of illumination provided by the at least one light source.

Preferably, the point of sale terminal is selected from a group consisting of: a check reader, a card-based payment terminal, an electronic cash register, a PIN pad, an automatic teller machine (ATM), an automated kiosk and an electronic vending machine.

Preferably, the light source driving circuitry is operative to cause the at least one light source to operate in a pulsed mode of operation and additionally to apply a driving voltage to the at least one light source which is randomly modulated between voltage levels of approximately 30 percent and 100 percent of a rated supply voltage thereto.

There is also provided in accordance with another preferred embodiment of the present invention a method of operating a point of sale terminal including a housing defining at least one interior location and at least one opening from the outside through which an insect can enter the at least one interior location and point of sale electronic circuitry located within the housing, the method including employing at least one light source located within the housing to illuminate at least one region adjacent the at least one opening and causing the at least one light source to output radiation of a type which repels an insect otherwise seeking to enter via the at least one opening.

BRIEF DESCRIPTION OF THE DRAWINGS

The present invention will be understood and appreciated more fully from the following detailed description, taken in conjunction with the drawings in which:

FIG. 2 is a sectional illustration of the point of sale terminal of FIG. 1, showing repelling of insects thereby.

DETAILED DESCRIPTION OF PREFERRED EMBODIMENTS

Figure 1:
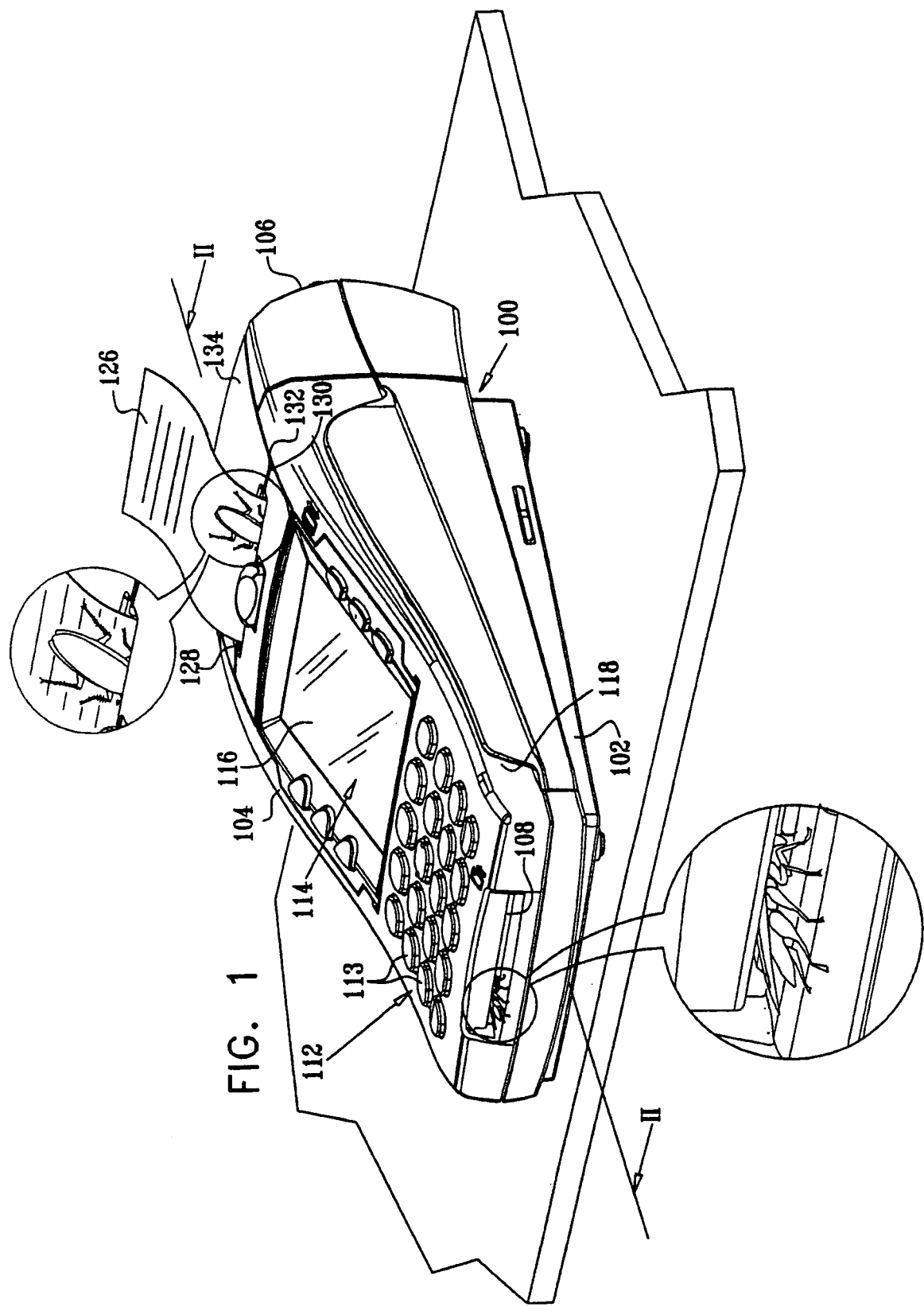
FIG. 1 is a simplified pictorial illustration of a point of sale terminal constructed and operative in accordance with a preferred embodiment of the present invention.

Reference is now made to FIGS. 1 & 2, which illustrate a point of sale terminal constructed and operative in accordance with a preferred embodiment of the present invention. As seen in FIGS. 1 and 2, the point of sale terminal may be generally similar in structure and function to a conventional point of sale terminal such as a NURIT 8100, commercially available from Lipman Electronic Engineering Ltd. of Rosh Haayin, Israel. It is appreciated that the present invention is not limited in its application to a given type or model of point of sale terminal but is applicable to any suitable point of sale terminal. Such a point of sale terminal may include, for example, a check reader, a card-based payment terminal, an electronic cash register, a PIN pad, an automatic teller machine (ATM), an automated kiosk and an electronic vending machine.

As seen in FIGS. 1 and 2, the point of sale terminal preferably includes a housing 100 including a base portion 102 and a top portion 104, which are typically snap-fitted together. In the illustrated embodiment, the housing also includes a detachable and replaceable printer housing portion 106. The top portion 104 of housing 100 defines a smart-card insertion slot 108, which communicates with a smart-card reader 110 located within the housing. The top portion 104 of the housing 100 also defines a keypad array location 112 wherein an array of keys 113 are located, and a display location 114, where a display, such as an LCD display 116, is located. Additionally, the top portion 104 of housing 100 preferably defines a magnetic card reader assembly 118.

A printer 120 is disposed within printer housing portion 106 and cooperates with a roll of paper 122, which is supported on a paper roll holder 124 located within printer housing portion 106. Printed receipts 126 are output via a printer paper slot 128 defined between an edge 130 of top portion 104 and a corresponding edge 132 of a paper roll cover 134.

In accordance with a preferred embodiment of the invention one or more LEDs 140 are mounted within the housing 100 and arranged to illuminate at least regions adjacent smart-card insertion slot 108 and printer paper slot 128. Preferably, the LEDs 140 also illuminate some or all of the interior of the housing 100, particularly regions which contain electronic circuitry or electrical apparatus which is warm as the result of its operation. Additionally, the magnetic card reader assembly 118 may be suitably illuminated and various regions on the outside of the housing 100 may be illuminated, such as the region of the keypad array location 112. It is a particular feature of the present invention that all physical openings to interior locations in the device are illuminated by one or more LEDs 140.

Preferably the LEDs 140 operate within a wavelength range of 300-1000 nm, and more particularly between 550-700 nm, and in a pulsed mode of operation, preferably within a frequency range of 0.5-30 Hz. Alternatively, randomly timed pulses may also be employed. Additionally or alternatively, the driving voltage to the LEDs 140 may be randomly modulated between voltage levels of approximately 30 percent and 100 percent of the rated LED supply voltage.

In accordance with a preferred embodiment of the present invention one or more interior surfaces within housing 100, such as interior housing surfaces and surfaces of elements located within the housing 100, are formed to be reflective of the light produced by the LEDs 140, thus enabling desired illumination of various regions interior of the housing by a single LED 140. Examples of such reflective surfaces are designated by reference numeral 144.

It is a particular feature of the present invention that LEDs 140 are provided on electrical circuit boards 146 which form part of the functionality of the device and that these LEDs 140 are so positioned with respect to openings to interior locations in the device and to reflective surfaces 144 of the device that insects which begin to enter such openings see the light pulses from the LEDs 140 and are thereby repelled and do not enter through the openings.

Preferably the illumination of the LEDs 140 does not cause the generation of discernable illumination outside of the device during normal operation. Alternatively, pulsed LED illumination can escape from the device. As a further alternative, an ambient light sensor 148 may be included in the device and circuitry on one of the circuit boards 146 may be operative in response to an output of the ambient light sensor, indicating relative darkness, inter alia, to govern the extent of the pulsed LED illumination so as to prevent insects from even approaching the device in the dark.

It will be appreciated by persons skilled in the art that the present invention is not limited to what has been particularly shown and described hereinabove. Rather the scope of the present invention includes both combinations and subcombinations of various features described hereinabove as well as modifications thereof which would occur to persons skilled in the art upon reading the foregoing specification and which are not in the prior art.

The invention claimed is:

1. A point of sale terminal comprising:
  a generally opaque housing defining at least one interior location and at least one opening from the outside through which an insect can enter said at least one interior location;
  point of sale electronic circuitry located within said housing;
  at least one light source located entirely within said housing and being operative to illuminate at least one region adjacent said at least one opening in a pulsed mode of operation; and
  light source driving circuitry operative to cause said at least one light source to output radiation of a type which repels an insect otherwise seeking to enter via said at least one opening.

2. A point of sale terminal according to claim 1 and wherein said at least one light source comprises an LED.

3. A point of sale terminal according to claim 2 and wherein said at least one light source is mounted onto a printed circuit board forming part of said point of sale electronic circuitry.

4. A point of sale terminal according to claim 3 and wherein said light source driving circuitry is also mounted onto said printed circuit board.

5. A point of sale terminal according to claim 2 and also comprising at least one reflective surface located within said housing for reflecting light from said at least one light source towards said at least one region adjacent said at least one opening.

6. A point of sale terminal according to claim 5 and wherein said at least one reflective surface includes an interior surface of said housing.

7. A point of sale terminal according to claim 2 and wherein said light source driving circuitry is responsive to ambient light conditions in the vicinity of said point of sale terminal to vary the extent of illumination provided by said at least one light source.

8. A point of sale terminal according to claim 1 and wherein said at least one light source is mounted onto a printed circuit board forming part of said point of sale electronic circuitry.

9. A point of sale terminal according to claim 8 and wherein said light source driving circuitry is also mounted onto said printed circuit board.

10. A point of sale terminal according to claim 1 and also comprising at least one reflective surface located within said housing for reflecting light from said at least one light source towards said at least one region adjacent said at least one opening.

11. A point of sale terminal according to claim 10 and wherein said at least one reflective surface includes an interior surface of said housing.

12. A point of sale terminal according to claim 10 and wherein said at least one light source is mounted onto a printed circuit board forming part of said point of sale electronic circuitry.

13. A point of sale terminal according to claim 12 and wherein said light source driving circuitry is also mounted onto said printed circuit board.

14. A point of sale terminal according to claim 1 and wherein said light source driving circuitry is responsive to ambient light conditions in the vicinity of said point of sale terminal to vary the extent of illumination provided by said at least one light source.

15. A point of sale terminal according to claim 14 and wherein said at least one light source comprises an LED.

16. A point of sale terminal according to claim 14 and wherein said at least one light source is mounted onto a printed circuit board forming part of said point of sale electronic circuitry.

17. A point of sale terminal according to claim 16 and wherein said light source driving circuitry is also mounted onto said printed circuit board.

18. A point of sale terminal according to claim 14 and also comprising at least one reflective surface located within said housing for reflecting light from said at least one light source towards said at least one region adjacent said at least one opening.

19. A point of sale terminal according to claim 18 and wherein said at least one reflective surface includes an interior surface of said housing.

20. A point of sale terminal according to claim 1 and wherein said point of sale terminal is selected from a group consisting of: a check reader, a card-based payment terminal, an electronic cash register, a PIN pad, an automatic teller machine (ATM), an automated kiosk and an electronic vending machine.

21. A point of sale terminal according to claim 1 and wherein said light source driving circuitry is operative to cause said at least one light source to operate in said pulsed mode of operation and additionally to apply a driving voltage to said at least one light source which is randomly modulated between voltage levels of approximately 30 percent and 100 percent of a rated supply voltage thereto.

22. A point of sale terminal according to claim 1 and wherein said at least one light source is operative to illuminate said at least one region with randomly timed pulses of illumination.

23. A point of sale terminal according to claim 1 and wherein said at least one light source is operative to illuminate said at least one region generally without causing generation of discernable illumination outside of said housing during normal operation.

24. A method of operating a point of sale terminal comprising a generally opaque housing defining at least one interior location and at least one opening from the outside through which an insect can enter said at least one interior location and point of sale electronic circuitry located within said housing, the method comprising:

employing at least one light source located entirely within said housing to illuminate at least one region adjacent said at least one opening in a pulsed mode of operation; and causing said at least one light source to output radiation of a type which repels an insect otherwise seeking to enter via said at least one opening.

25. A method according to claim 24 and wherein said employing comprises employing said at least one light source to illuminate said at least one region with randomly timed pulses of illumination.

26. A method according to claim 24 and wherein employing comprises employing said at least one light source to illuminate said at least one region generally without causing generation of discernable illumination outside of said housing during normal operation.

* * * * *